Oct. 7, 1941. G. P. MARSDEN ET AL 2,258,461
UNSTACKING ELEVATOR
Filed March 10, 1939 8 Sheets-Sheet 2
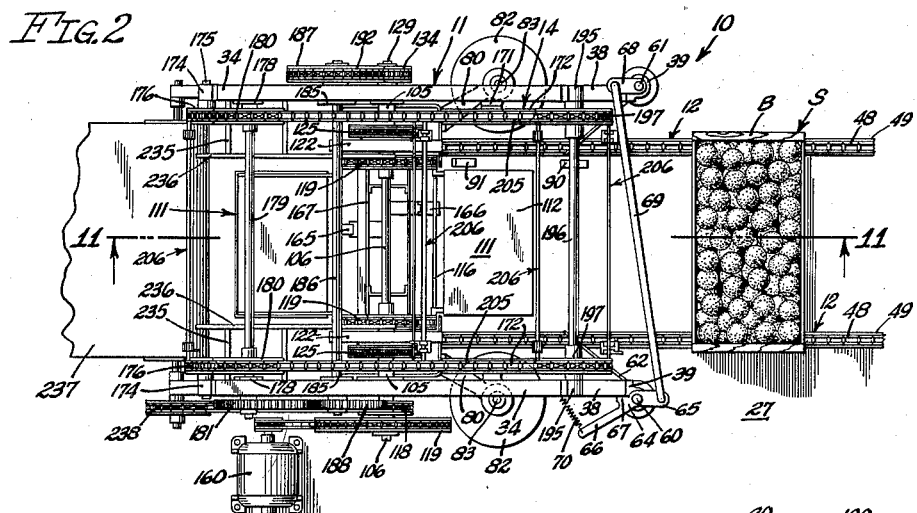
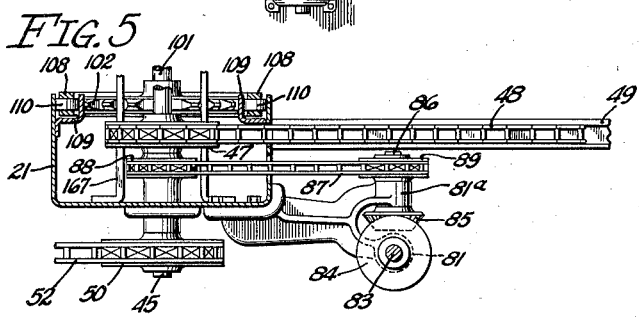
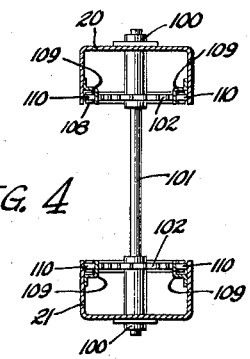
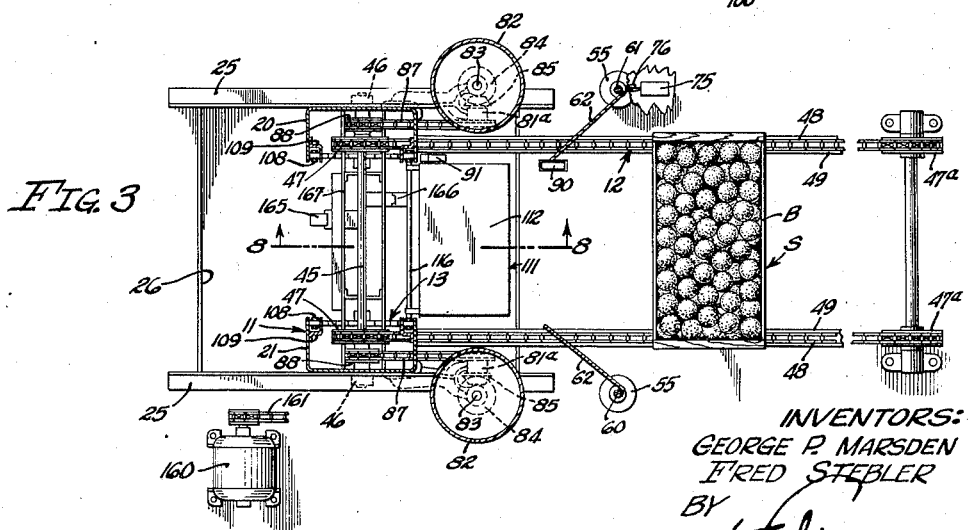
INVENTORS:
GEORGE P. MARSDEN
FRED STEBLER
BY
ATTORNEY

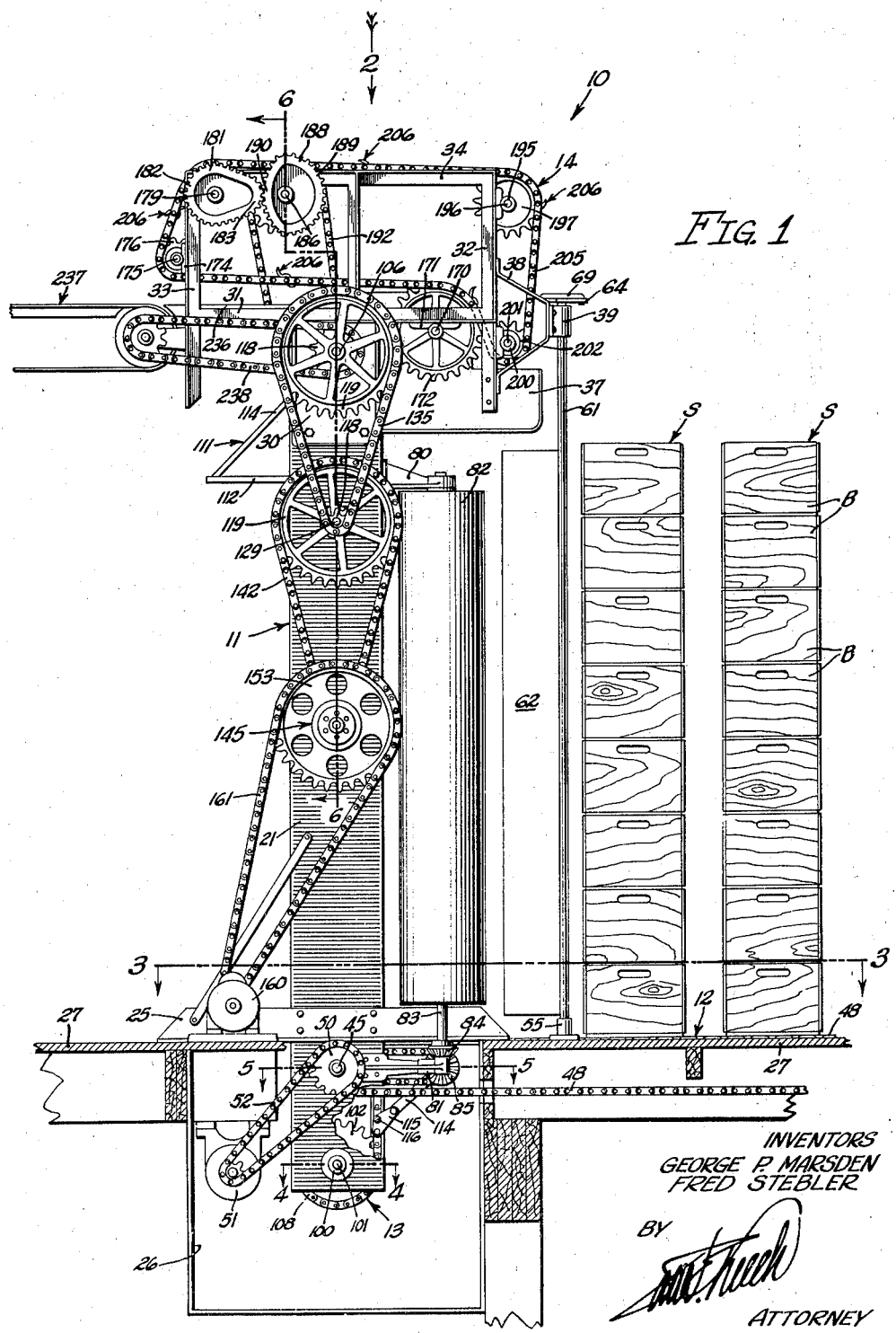

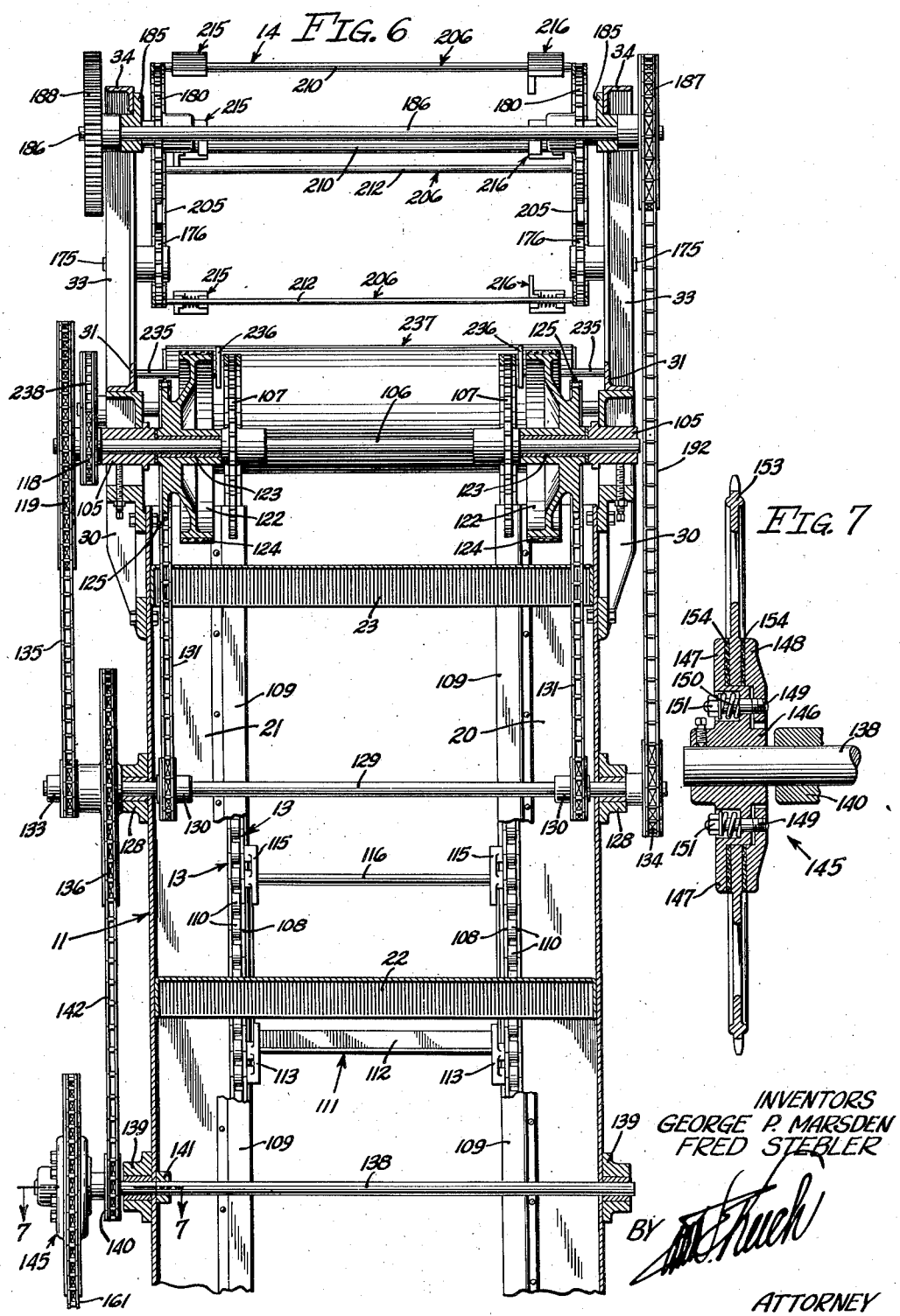

Oct. 7, 1941.  G. P. MARSDEN ET AL  2,258,461
UNSTACKING ELEVATOR
Filed March 10, 1939  8 Sheets-Sheet 4
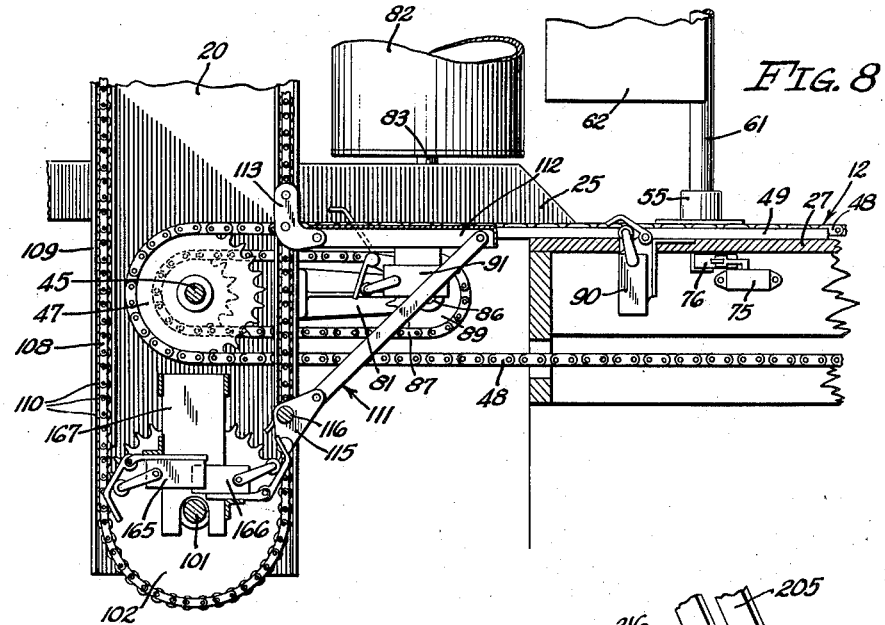
FIG. 8
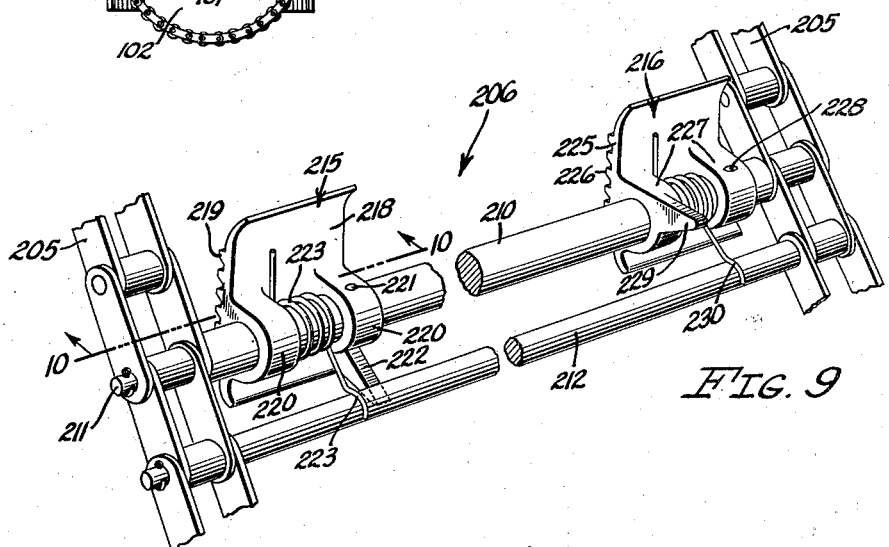
FIG. 9
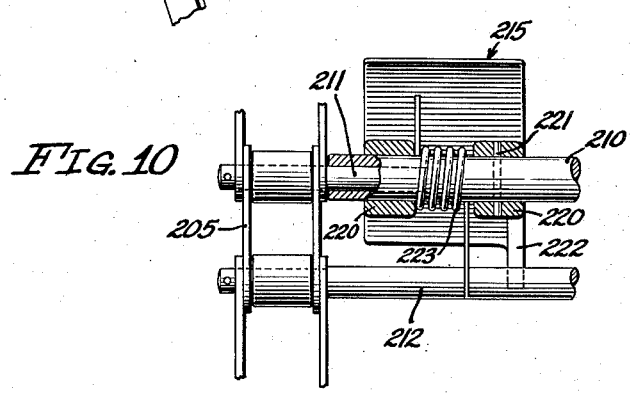
FIG. 10
INVENTORS
GEORGE P. MARSDEN
FRED STEBLER
BY
ATTORNEY Oct. 7, 1941.   G. P. MARSDEN ET AL   2,258,461
UNSTACKING ELEVATOR
Filed March 10, 1939   8 Sheets-Sheet 5
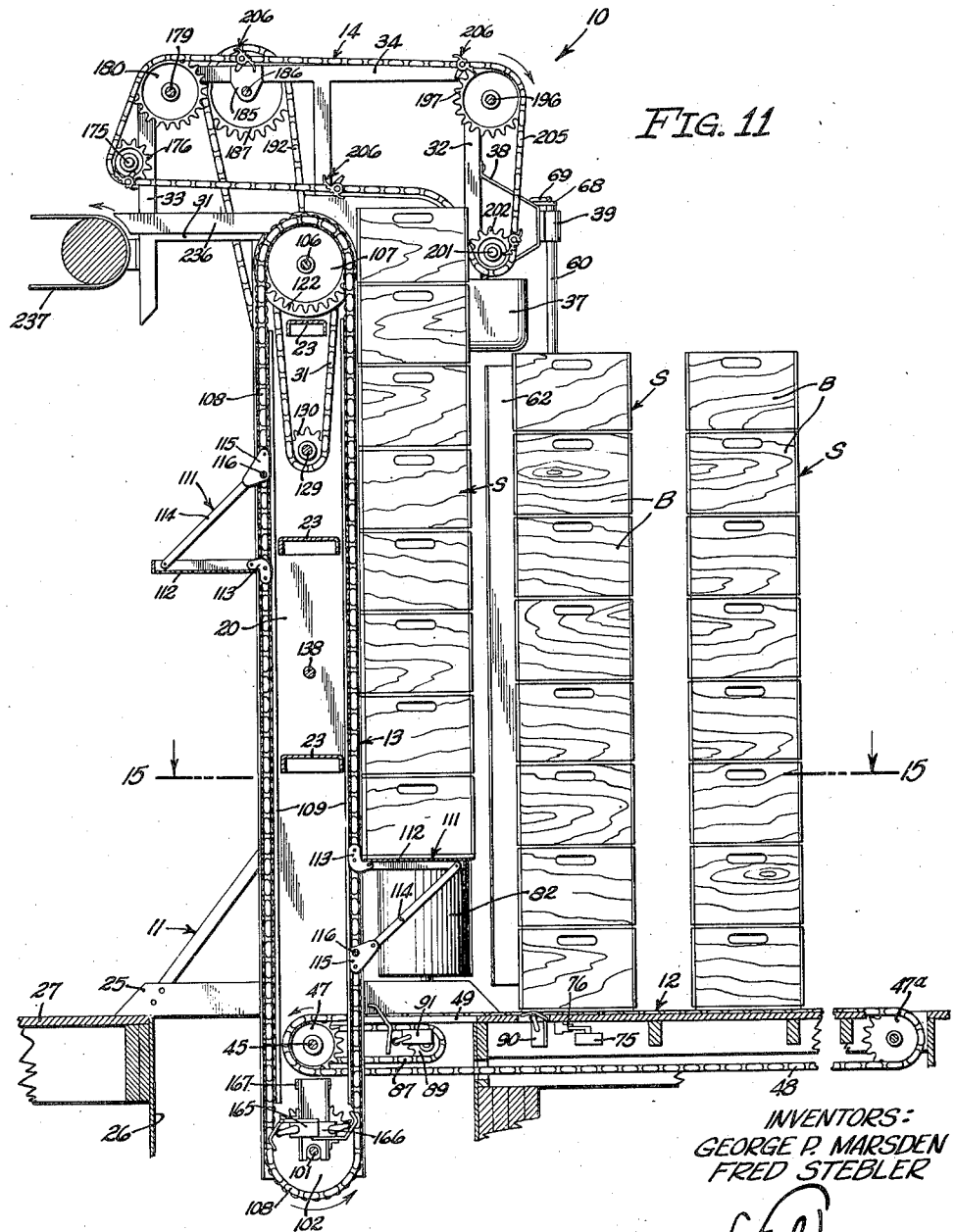
FIG. 11
INVENTORS:
GEORGE P. MARSDEN
FRED STEBLER
BY 
ATTORNEY

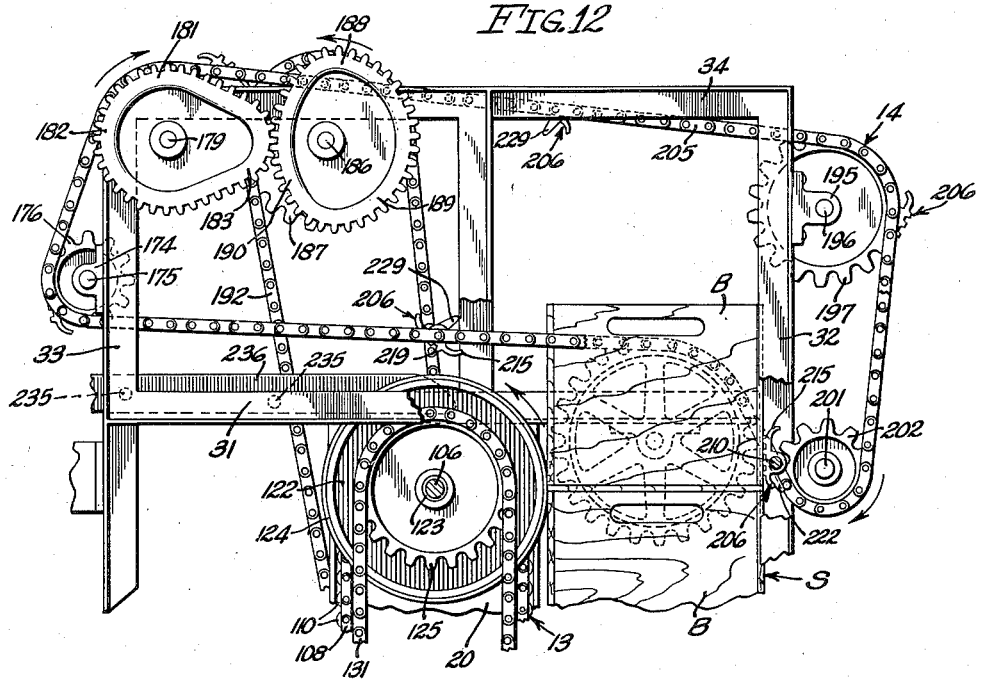
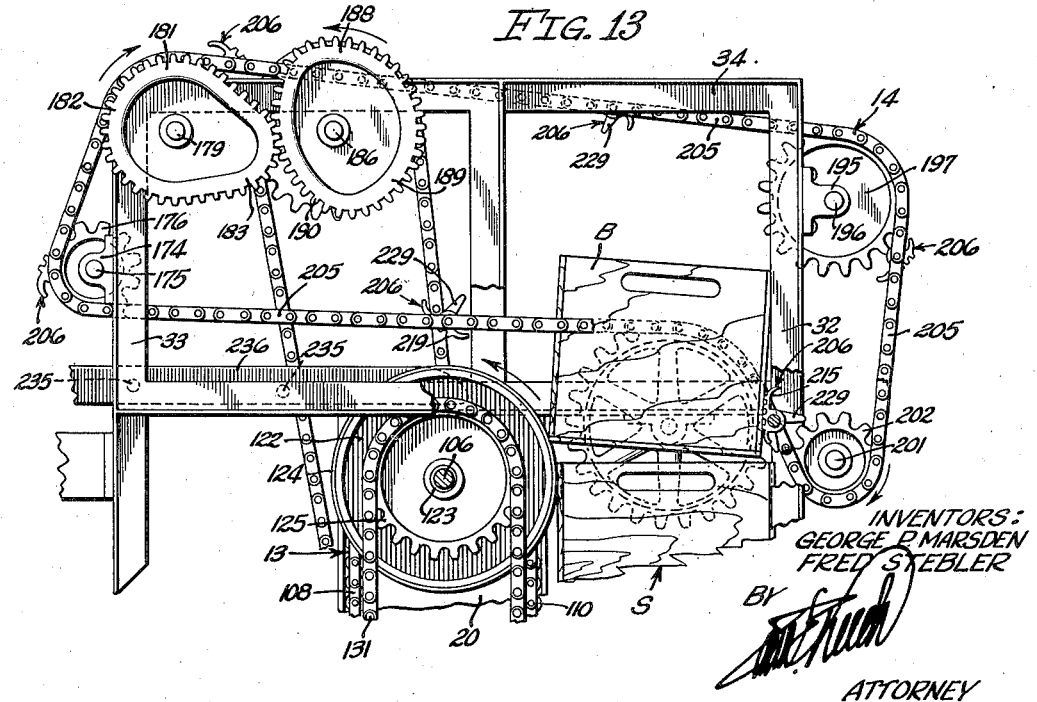

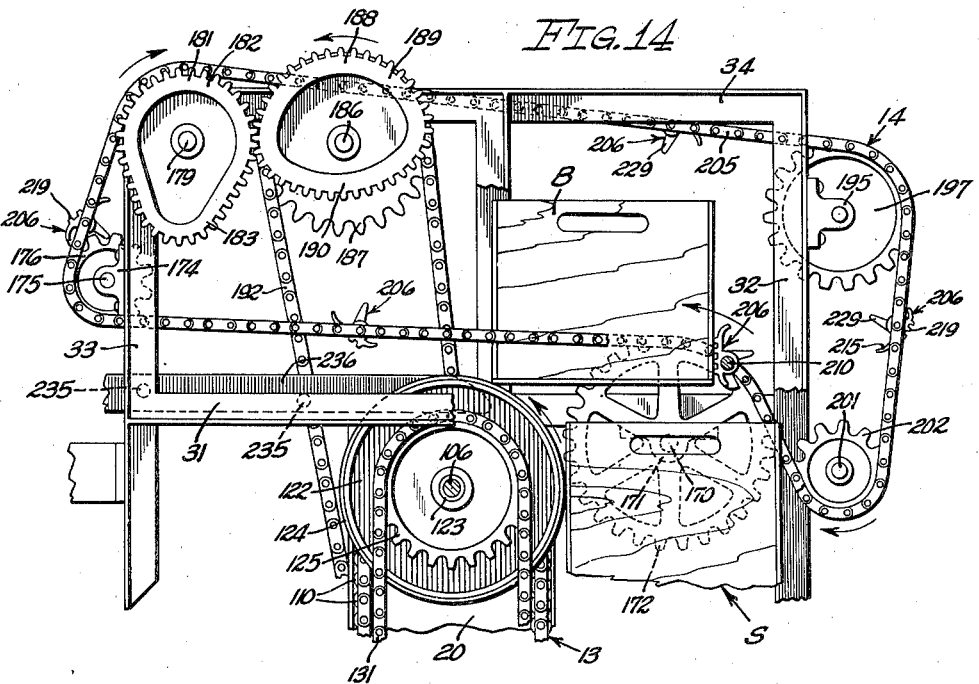

Oct. 7, 1941.  G. P. MARSDEN ET AL  2,258,461
UNSTACKING ELEVATOR
Filed March 10, 1939  8 Sheets-Sheet 8
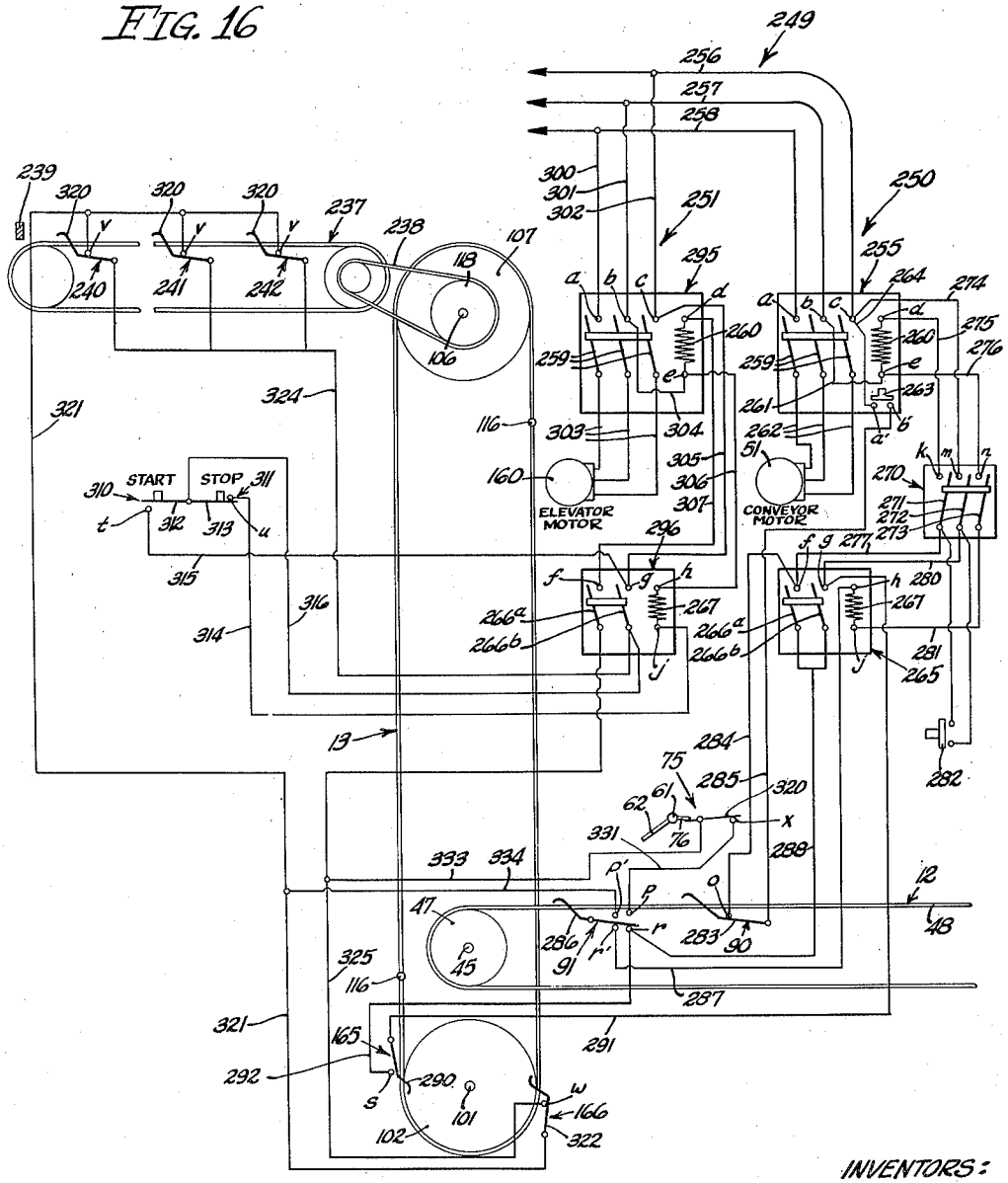
FIG. 16
INVENTORS:
GEORGE P. MARSDEN
FRED STEBLER
BY
ATTORNEY Patented Oct. 7, 1941

2,258,461

UNITED STATES PATENT OFFICE 2,258,461

UNSTACKING ELEVATOR

George P. Marsden and Fred Stebler, Riverside, Calif., assignors to Food Machinery Corporation, San Jose, Calif., a corporation of Delaware Application March 10, 1939, Serial No. 261,018

28 Claims. (Cl. 198—35)

This invention relates to machines for handling receptacles and more particularly to machines for unstacking stacks of boxes. Although useful in other industries, the present invention is shown and described in relation to the citrus industry.

In this industry, oranges are brought from the groves to the packing houses in field boxes, the latter being stored in stacks until convenient to run the fruit contained in these boxes through the processes of washing, grading, packing and otherwise preparing the fruit for market. The practice in handling lemons on the otherhand, is to pick the fruit when partially green and after washing and sorting the fruit as to color, the green fruit is placed loose in shipping boxes which are stored in stacks for as much as four to eight weeks until the fruit ripens sufficiently for marketing. The stacks of boxes containing such fruit are usually stored in the packing house basement where it is cool and the boxes are elevated to the main floor of the building when the time comes to prepare the fruit for shipment.

Of the several methods employed for elevating full boxes of fruit from the basement to the main floor, the present invention relates to the method of elevating an entire stack and discharging the boxes, one at a time, from the top of the stack onto a horizontal conveyor prior to dumping the fruit from the boxes. In this method of unstacking boxes, the latter are retained in upright position during the unstacking process and are dumped manually or by a box dumping machine after being unstacked.

A common principle employed in machines used heretofore for unstacking stacks of boxes is to elevate the stack and slide each successive uppermost box from the top of the stack and discharge the boxes, individually, onto a horizontal conveyor. This practice often results in injury to the fruit and the boxes or jamming of the machine when projecting nails and other irregularities of the boxes interfere with the sliding of one box on top of another.

Other types of machines designed for unstacking and dumping stacks of filled boxes employ a mechanism for clamping the box by pressing inwardly against its ends with sufficient pressure to enable such mechanism to lift each loaded box from top of a stack and deposit the box on a separate box conveyor. Fruit boxes are usually constructed by nailing side and bottom shook to side and bottom edges of the heads and machines which employ this principle of pressing inwardly against the box heads impose considerable strain on the nails holding the sides and bottom to the box heads and repeated strains of this nature tend to loosen the nails and eventually destroy the box.

It is an object of the present invention to provide a machine for unstacking stacks of loaded boxes in which each successive uppermost box of a rising stack is lifted vertically free from the box thereunder prior to lateral shifting of the box out of the path of said rising stack.

Another object of this invention is the provision of such a box lifting mechanism which operates by clamping a box on the sides rather than the ends thereof in a manner to prevent injury to the box.

A further object of this invention is the provision of a box unstacking mechanism adapted to retain a box in upright position during the lifting of said box from the top of a rising stack and the shifting of said box out of the path of said rising stack.

Still another object of the invention is to prevent the breakage of boxes, etc., due to a stack being elevated with the boxes thereof in misalignment.

Yet another object of this invention is the provision of such a machine in which the boxes of a stack being fed thereto on a floor conveyor are aligned transversely of the direction of travel of said stack prior to engagement of said stack by the stack elevator.

The preferred manner of accomplishing the foregoing objects as well as further objects and advantages will be made apparent in the following description taken in connection with the accompanying drawings, in which:

Fig. 1 is a side elevational view of a preferred embodiment of the unstacker of this invention.

Fig. 2 is a plan view of the machine shown in Fig. 1.

Fig. 3 is a horizontal cross sectional view taken on the line 3—3 of Fig. 1.

Fig. 4 is a horizontal sectional view taken on the line 4—4 of Fig. 1.

Fig. 5 is an enlarged, fragmentary, horizontal sectional view taken on line 5—5 of Fig. 1.

Fig. 6 is an enlarged vertical sectional view taken on the line 6—6 of Fig. 1.

Fig. 7 is an enlarged horizontal sectional view taken on the line 7—7 of Fig. 6.

Fig. 8 is an enlarged sectional view taken on the line 8—8 of Fig. 3.

Fig. 9 is a detail perspective view of the box gripping mechanism of the machine of the invention.

Fig. 10 is a fragmentary, sectional view taken on the line 10—10 of Fig. 9.

Fig. 11 is a vertical sectional view through the entire machine taken on the line 11—11 of Fig. 2.

Fig. 12 is an enlarged fragmentary view of the upper portion of the machine of the invention and showing the operation thereof.

Figs. 13 and 14 are sectional views similar to Fig. 12 showing successive portions of the mechanism during the operation thereof.

Fig. 15 is a horizontal sectional view similar to Fig. 3 illustrating the operation of certain parts of the machine.

Fig. 16 is an electrical diagram showing the manner in which the machine of the invention is electrically controlled and operated.

Referring specifically to the drawings, an unstacker 10 comprising a preferred embodiment of this invention is shown in Fig. 1.

The machine 10 includes a frame 11, a stack conveyor 12, a stack elevator 13 and an unstacking conveyor 14 mounted on the upper end of the frame 11.

The frame 11

The frame 11 includes a pair of vertically disposed channels 20 and 21, the latter being shown in Fig. 3 and connecting the channels 20 and 21 as shown in Figs. 6 and 11 are cross members 22 and 23. Fixed to each of the channels 20 and 21 as shown in Figs. 1 and 3 are horizontal angle irons 25, the latter supporting the channels 20 and 21 over a suitable pit 26 provided in a floor 27. Fixed on upper extremities of the channels 20 and 21 are brackets 30 shown in Fig. 6 upon which horizontal angle irons 31 are mounted. Fixed on opposite ends of the angle irons 31 are vertically disposed pairs of angle iron members 32 and 33, the latter being joined at their upper ends by horizontal angle irons 34 as shown in Figs. 1, 2 and 6. Attached to upper ends of the channels 20 and 21 is a pair of guide plates 37, these being fixed to lower extremities of the angle irons 32 as shown in Fig. 1. Mounted on brackets 38 extending from the angle irons 32 are bearings 39, the purpose of which will be made clear hereinafter.

The stack conveyor 12

The stack conveyor 12 includes a transverse shaft 45, the latter being journalled in bearings 46 provided on the channels 20 and 21 as shown in Fig. 3. Fixed on the shaft 45 is a pair of sprockets 47, the latter being aligned with a pair of idle sprockets 47a mounted in the floor 27 at the opposite end of the stack conveyor 12 as shown in Figs. 3 and 11. Trained about the sprockets 47 and the idle sprockets 47a are chains 48, upper flights of which are carried in suitable tracks 49 provided on the floor 27 as shown in Fig. 3. Fixed on one end of the shaft 45 as seen in Figs. 1 and 5, is a sprocket 50, the latter being driven from a suitable motor 51 by a chain 52.

Provided on the floor 27 on opposite sides of the stack conveyor 12 are bearings 55, the latter being aligned with the aforementioned bearings 39 as shown in Fig. 1. Journalled in the bearings 39 and 55 are vertical shafts 60 and 61 each of which has a gate 62 thereon as shown in Figs. 1 and 3. Mounted on the upper end of the shaft 60 as shown in Fig. 2 is a lever 64 having arms 65 and 66 thereon and formed to provide a stop 67, the latter engaging the bracket 38. Fixed on the upper extremities of the shaft 61 is a lever 68, the latter being connected to the aforementioned arm 65 of the lever 64 by a diagonal cross link 69. Connected to the arm 66 of the lever 64 and the frame 11 is an extension spring 70 for the purpose of maintaining the shafts 60 and 61 in the positions in which they are shown in Fig. 2. Mounted beneath the floor 27 as shown in Figs. 3 and 11 is a switch 75 which is operated by a lever 76 fixed on the lower end of the shaft 61. Journalled in upper and lower pairs of bearings 80 and 81 respectively, mounted on the channels 20 and 21 are vertical drums 82 having shafts 83 as shown in Figs. 1, 2 and 3. Fixed on lower ends of the shafts 83 of the drums 82 are bevel gears 84, the latter meshing with bevel gears 85 which are fixed to shafts 86, these being journalled in bearings 81a formed integrally with the bearings 81 as seen in Fig. 5. The shafts 86 are driven from the conveyor shaft 45 by chains 87 trained about sprockets 88 on the shaft 45 and sprockets 89 on the shafts 86.

Mounted adjacent the floor conveyor 12 as shown in Fig. 8 is a pair of switches 90 and 91, the latter being provided for the purpose of controlling the stack conveyor 12 in a manner to be described hereinafter.

The stack elevator 13

Journalled in suitable bearings 100 provided on lower extremities of the channels 20 and 21 is a transverse shaft 101 having a pair of sprockets 102 fixed thereon as shown in Figs. 4 and 11. Journalled in bearings 105 on the brackets 30 at the upper extremities of the channels 20 and 21, as shown in Fig. 6, is a transverse shaft 106, the latter having sprockets 107 fixed thereon which are disposed in alignment with the sprockets 102 of the shaft 101. Trained about the sprockets 102 and 107 are stack elevator chains 108 guided by suitable tracks 109 provided on the channels 20 and 21 as shown in Figs. 3 and 4. As shown in Fig. 8, the chains 108 are provided with oversize rollers 110 to reduce friction between the chains and the tracks 109. Carried by the chains 108 as shown in Figs. 8 and 11 is a pair of elevating baskets 111, each of the latter including a platform 112 secured to brackets 113 fixed on the chains 108. For the purpose of bracing the platforms 112, diagonal braces 114 are provided, the latter extending from the platforms 112 to suitable brackets 115, these being also attached to the chains 108. Extending transversely between the chains 108 and brackets 115 of the baskets 111 are spacer rods 116. Fixed on one extremity of the shaft 106 as shown in Fig. 6 is a small and a large sprocket, 118 and 119 respectively and rotatable on the shaft 106 between the bearings 105 and sprockets 107 is a pair of friction wheels 122, the latter having bushings 123. The wheels 122 are provided on their outer peripheries with treads 124 of suitable friction material as shown in Fig. 6. Formed integral with each of the wheels 122 is a sprocket 125, the purpose of which will be made clear hereinafter. Journalled in bearings 128 provided on channels 20 and 21 below the shaft 106 is a shaft 129 having a pair of small sprockets 130 fixed thereon, the latter being in vertical alignment with the sprockets 125 of the wheels 122, the latter being driven from the shaft 129 by suitable chains 131 trained about the sprockets 125 and 130. Fixed on the extremities of the shaft 129 as shown in Fig. 6 are sprockets 133 and 134. The sprocket 133 is in alignment with the aforementioned sprocket 119 of the shaft 106, the latter being driven by a chain 135 trained about the sprockets 119 and 133. Fixed on the shaft 129 between the sprocket 133 and the adjacent bearing 128 is a sprocket 136. Below the shaft 129 is a shaft 138 which is journalled in bearings 139 also provided on frame channels 20 and 21, the shaft 138 having a sprocket 140 and collar 141 fixed thereon. The shaft 138 is adapted to drive the shaft 129 by means of a chain 142 trained about the sprockets 140 and 136 as shown in Figs. 1 and 6.

Mounted on one end of the shaft 138 adjacent the sprocket 140 is a safety sprocket 145, the latter including a hub 146 as shown in detail in Fig. 7. Formed integral with the hub 146 is an annular flange 147, and yieldably mounted relative to the hub 146 is an annular plate 148, the latter being secured against rotation in relation to the hub 146 by studs 149, these being threaded into the plate 148 and extending through suitable holes provided in the hub 146. On each of these studs 149 is a compression spring 150, the latter being compressed by nuts 151 provided on the studs 149. Mounted between the flange 147 and the plate 148 is a sprocket 153, the latter having rings 154 of brake lining material provided on opposite sides thereof. The sprocket 153 drives the shaft 138 by frictional engagement of the flange 147 and the plate 148 with the rings 154. The nuts 151 are adjusted so that the sprocket 153 will drive the shaft 138 during normal operation of the machine 10 and in the event of an emergency resulting from jamming of any of the mechanism of the machine 10, the safety sprocket 145 slips in relation to the hub 146 so as to prevent breakage of the machine.

The stack elevator 13 is driven by a motor 160 mounted on the floor 127, a chain 161 extending from the motor 160 to the safety sprocket 145 as shown in Fig. 1. Provided at the lower end of the stack elevator 13 as shown in Fig. 8 is a pair of switches 165 and 166, the latter being supported by a frame 167 extending horizontally between the channels 20 and 21. The switches 165 and 166 are provided for the purpose of controlling the stack conveyor 12 and the stack elevator 13 in a manner to be described hereinafter.

*The box unstacking conveyor 14*

The unstacking conveyor 14 shown in Figs. 1 and 2 includes a pair of aligned stub shafts 170 journalled in bearings 171 mounted on the under side of the angle iron frame members 31. Mounted on the inner ends of the stub shafts 170 are idle sprockets 172. Mounted on the vertical angle iron members 33 are bearings 174 in which stub shafts 175 are fixed, the latter having idle sprockets 176 mounted thereon. Rotatably mounted in bearings 178 as shown in Fig. 2 on the upper angle iron members 34 is a transverse shaft 179 having a pair of sprockets 180 fixed thereon. Fixed on one extremity of the shaft 179 is an irregularly shaped gear 181, the latter being formed to provide a semi-circular, concentric portion 182 as shown in Fig. 1 and an eliptical portion 183. Journalled in bearings 185 provided on the members 34, is a transverse shaft 186, the latter having a sprocket 187 on one end thereof and an irregular gear 188 on its opposite end. The gear 188 has a semi-circular concentric portion 189 and an eliptical portion 190. The shaft 186 is driven from the aforedescribed shaft 129 by a chain 192, trained about the sprockets 134 and 187 as shown in Figs. 2 and 6. Mounted in bearings 195 (see Figs. 1 and 2) provided on the angle iron frame members 32 is a transverse shaft 196 having sprockets 197 fixed thereon. Below the bearings 195 are similar bearings 200 in which aligned stub shafts 201 are fixed, the latter having idle sprockets 202 rotatably mounted on the inner ends thereof. Trained about the sprockets 172, 176, 180, 197 and 202 are endless chains 205, the latter having a plurality of equally spaced box-engaging members 206 extending transversely therebetween.

As shown in Figs. 9 and 10, each of the box engaging members 206 includes a transverse shaft 210 pivotally mounted at its ends on pins 211 extending inwardly from the chains 205. Extending between the chains 205 adjacent to the shaft 210 is a rod 212. Fixed on the shaft 210 adjacent each of the chains 205 is a pair of box-engaging shoes 215 and 216. The shoe 215 includes a plate 218 having a corrugated face 219 formed thereon. Integral with the plate 218 is a pair of bosses 220 bored to receive the shaft 210, the latter being fixed to the shoe 215 by a pin 221. Formed integral with the plate 218 and extending below the rod 212 is a stop finger 222. Coiled about the shaft 210 between the bosses 220 of the shoe 215 is a torsion spring 223. The shoe 216 is similar to the shoe 215, having a plate 225 provided with a corrugated face 226. Formed integral with the plate 225 is a pair of bosses 227 bored to receive the shaft 210 and being fixed thereto by a pin 228. Formed integral with one of the bosses 227 is a stop finger 229 extending above the rod 212, and provided on the shaft 210 between the bosses 227 is another torsion spring 230. The springs 223 and 230 of the shoes 215 and 216 respectively tend to urge the shoes into the position in which they are shown in Fig. 9, with the finger 222 of the shoe 215 engaging the under side of the rod 212 as shown.

Mounted on the angle iron frame members 31, as shown in Figs. 2, 6, 11 and 12 are horizontal rods 235 to which a pair of spaced slide rails 236 are fixed, the latter serving to support the boxes discharged by the unstacking conveyor 14.

Mounted on and extending from the upper end of the frame 11 as shown in Figs. 1, 11 and 16 is an accumulator conveyor 237, the latter being driven by a chain 238 trained about the aforementioned sprocket 118 on the stack elevator shaft 106 as shown in Fig. 1. Provided on the accumulator 237 as diagrammatically shown in Fig. 16, is a box stop 239 and three limit switches 240, 241 and 242.

Operation of the machine 10 is controlled by an electrical apparatus 249 shown in Fig. 16, the apparatus 249 including a control circuit 250 for the stack conveyor 12 and a circuit 251 for controlling the stack elevator 13. The circuit 250, described in detail hereinafter, is provided for the purpose of starting or stopping the stack conveyor motor 51 to cause the stack conveyor 12 to supply stacks of boxes to the elevator 13 as needed and in timed relation with the operation of the elevator 13. The circuit 251 serves to start or stop the stack elevator motor 160 to enable the stack elevator 13 and the box unstacking conveyor 14 to deliver single boxes to the accumulator conveyor 237 until the latter is full of boxes at which time the three switches 240, 241 and 242 of the accumulator 237 are all opened so as to break the circuit 251 and stop the elevator motor 160. The two circuits 250 and 251 are inter-related but will be first described separately, the manner in which they are interrelated being pointed out later.

The stack conveyor control circuit 250 includes a three pole magnetic switch 255 having contact points *a*, *b* and *c*, the latter being supplied with three phase current through lead wires 256, 257 and 258. In the switch 255 are three blades 259, these being brought into or out of engagement with the contacts *a*, *b*, and *c* by a magnetic coil 260 having terminals *d* and *e*. Connecting the contact *b* with the terminal *e* of the coil 260 is a wire 261 and extending from the blades 259 to the stack conveyor motor 51 are three wires 262. Also included in the switch 255 is a circuit closer 263 adapted to bridge contacts *a'* and *b'* whenever the coil 260 is energized.

The magnetic switch 255 is controlled by a relay switch 265 having contacts *f* and *g*, blades 266*a*, 266*b* and a magnetic coil 267 provided with terminals *h* and *j*. Positioned between the magnetic switch 255 and the relay 265 is a three pole manually operated switch 270 having contacts *k*, *m*, *n*, and blades 271, 272 and 273. Extending from the contact *c* of the switch 255 to the contact *m* of the switch 270 is a wire 274 and connecting the terminals *d* and *e* of the coil 260 and the contacts *k* and *n* of the switch 270 are wires 275 and 276 respectively. Joining the blades 271 and 272 of the switch 270 with the contacts *f* and *g* of the relay 265 are wires 277 and 280, the blade 273 being connected to the terminal *j* of the coil 267 by a wire 281. Connected to the blades 271 and 272 of the switch 270 is a stack conveyor jog switch 282. The first stack conveyor switch 90 includes an arm 283 which normally engages a contact *o*, the latter being connected to the contact *f* of the relay 265 by a wire 284. Extending from the arm 283 of the switch 90 to the contact *b'* of the circuit closer 263 is a wire 285. The second stack conveyor switch 91 has an arm 286, a pair of upper contacts *p* and *p'* and lower contacts *r* and *r'*, the contact *r'* being connected by a wire 287 to the terminal *h* of the coil 267 in the relay 265. The contact *r* of the switch 91 is joined to both blades 266*a* and 266*b* of the relay 265 by a wire 288. The switch 165 at the lower end of the stack elevator 13 includes an arm 290 and contact *s*, the arm 290 being joined by a wire 291 with the contact *g* of the relay 265 while the contact *s* is connected by a wire 292 with the contact *r* of the second stack conveyor switch 91.

The stack elevator control circuit 251 includes a three-pole magnetic switch 295 and a relay switch 296, these being similar to the switches 255 and 265 of the circuit 250 and having the parts thereof designated by similar reference characters. Connecting the lead wire 256, 257 and 258 with the contacts *a*, *b* and *c* of the switch 295 are wires 300, 301 and 302, respectively, and extending from the blades 259 of the switch 295 to the stack elevator motor 160 are three wires 303. Connecting the contact *b* and terminal *e* of the coil 260 in the switch 295 is a wire 304 and joining the contact *c* of switch 295 with contact *g* of the relay 296 is a wire 305. Extending from the terminal *e* of the coil 260 in the switch 295 to the terminal *h* of the coil 267 of the relay 296 is a wire 306, and a wire 307 is provided to connect the terminal *d* in switch 295 with the contact *f* of the relay 296.

Provided in the stack elevator control circuit 251 are start and stop switches 310 and 311 respectively having arms 312 and 313 and contacts *t* and *u*. Extending from the contact *u* of the switch 311 is a wire 314, the latter extending to the terminal *j* of the coil 267 of the relay 296. The contact *t* of switch 310 is connected to contact *g* of the relay 296 by a wire 315 and extending from both of the arms 312 and 313 of the switches 310 and 311 is a single wire 316 which extends to the blade 266*b* of the relay 296. The accumulator switches 240, 241 and 242 include arms 320 and contacts *v*, the latter being connected to a single wire 321 which extends to an arm 322 of the switch 166 at the lower end of the elevator 13. The arms 320 of the accumulator switches 240, 241 and 242 are connected by a wire 324 to the blade 266*b* of the relay 296. The arm 322 of the switch 166 normally engages a contact *w*, the latter being joined with the blade 266*a* of the relay 296 by a wire 325.

The aforementioned switch 75, positioned adjacent shaft 61 (see Figs. 3 and 8) is shown diagrammatically in Fig. 16 and includes a contact *x* and a switch arm 330, the latter being normally urged into engagement with the contact *x* as shown. The contact *x* is connected to the upper contact *p* of the second stack conveyor switch 91 by a wire 331.

The two circuits 250 and 251 are inter-connected by a pair of wires 333 and 334, the former extending from the wire 325 to the arm 330 of switch 75 and the latter extending from the wire 321 to the contact *p'* of the second stack conveyor switch 91.

*Operation*

In practice, the unstacker 10 of this invention is preferably mounted on the floor 27 of a packing house basement as shown in Fig. 1 with the upper end of the machine extending through the main floor (not shown) of the packing house where the fruit is prepared for marketing. After loading the stack conveyor 12 with stacks S of boxes B as shown in Fig. 1, the truckman working in the basement closes the knife switch 270. Closing of the switch 270 does not start the unstacker 10 but simply closes the necessary circuits to enable the unstacker to start when the operator on the main floor actuates the "Start" switch 310, the knife switch 270 being provided as a safety measure to enable the truckman to prevent the unstacker 10 from being started when the latter is being serviced.

When the operator on the main floor is ready to have boxes of fruit delivered by the unstacker 10 to the accumulator 237, he actuates the "Start" switch 310 which, through the relay 296 and magnetic switch 295, starts the elevator motor 160. The elevator 13 runs continuously during normal operation of the unstacker 10 and stops only when the accumulator 237 is full of boxes or when an interruption occurs in the delivery of the stacks S to the elevator 13.

The switches 320 are so arranged with relation to the accumulator 237 that when the latter is filled with boxes all three of the switches are depressed in open position. This breaks the circuit of the coil 260 of the switch 295 causing the latter to cut out and stop the elevator motor 160. Whenever a box over one of the switches 320 is then removed from the accumulator 237 the circuit of the coil 260 is re-established causing the elevator and accumulator to be again set in motion.

The orderly and timely delivery of stacks of boxes to the elevator 13 by the conveyor 12 is controlled by the switches 90, 91, 165 and 166. Before describing the manner in which the conveyor 12 and elevator 13 co-operate in the delivery and elevation of stacks of boxes, it will be helpful to point out certain conditions under which these switches will start or stop the motors controlled thereby.

1. Closing the switch 165 momentarily by the passage of a rod 116 of the elevator past this switch will start the conveyor 12 only when the switch 91 is positioned as shown in Fig. 16, that is, when it is closed on the conveyor side, the switch 91 being in this condition when no stack is disposed on the conveyor 12 directly over this switch. In order for a stack to reach this position, it must be delivered by the conveyor 12 into the proper position to be elevated by the elevator 13, that is, with the stack engaging the upright frame members 20 and 21 of the elevator as shown in Fig. 15.

2. The opening of the switch 166, as when this is contacted by one of the rods 116 on the elevator 13, will stop the elevator only when the switch 91 is open on the elevator side, that is, when this switch is not depressed so as to connect the terminals $p$ and $p'$. Thus it is seen that when the switch 91 is disposed as shown in Fig. 16 and one of the bars 116 opens the switch 166, this will cause the operation of the elevator 13 and the accumulator conveyor 237 to be halted.

3. Assuming the conveyor 12 is in motion, it is to be noted that the opening of switch 90 as by the engagement therewith of the bottom box of a stack travelling along on the moving conveyor 12 will not stop this conveyor when the switch 91 is closed on the conveyor side as shown in Fig. 16.

4. Opening the switch 91 on the conveyor side will not stop the conveyor 12 when the switch 90 is closed. Thus, when the initial stack, travelling on the conveyor 12 passes over the switch 90 and releases this so the latter is closed and then continues to be carried along the conveyor 12 until it passes over and depresses the switch 91 so that the stack engages the frame members 20 and 21 which stop its forward progress, the conveyor 12 is not stopped but continues to travel, the chains of this conveyor slipping underneath the foremost stack, forward movement of which has thus been stopped.

5. Opening the switch 90, when switch 91 is open on the conveyor side, will stop the conveyor 12. This occurs when, after the first stack has been delivered against the frame uprights 20 and 21 so as to ride over and depress the switch 91, a second stack carried by the conveyor 12 arrives in position where it travels over the switch 90 and depresses this. As noted, this stops the conveyor 12.

6. In case the conveyor 12 should be halted as by the opening of the switch 90 while the switch 91 is open, and the switch 90 should then be closed, as by the lifting of a stack therefrom, this will not start the conveyor 12 in motion and the only thing which will start the conveyor now is the momentary closing of the switch 165 or the actuation of the jog 282.

As aforementioned, the stack elevator is started in motion by the actuation of the "Start" switch, 310. This does not immediately start the conveyor 12, however, the latter remaining idle until one of the rods 116 on the conveyor 13 engages the switch 165 and momentarily closes this. This energizes the relay 265 which closes the magnetic switch 255 and starts the conveyor 12 in motion. With the switches 90, 91, 165 and 166 functioning as heretofore described, it will be seen that when the conveyor 12 is started as by the momentary closing of the switch 165, the stacks of boxes which have been placed on the conveyor 12 travel with this conveyor towards the elevator 13 until the foremost stack passes over the switch 90 and then over the switch 91 which is held in depressed position by said foremost stack then the latter is delivered against the frame uprights 20 and 21 in the proper position for being elevated. The conveyor 12, of course, continues to operate after the forward motion of the first stack is thus halted by its delivery against the frame members 20 and 21, so that the next succeeding stack eventually travels over and depresses switch 90 thus opening the latter and halting the conveyor.

If the delivery of the foremost stack over the switch 91 is delayed so that this has not been accomplished at the time the rod 116 which started the conveyor 12 by momentarily engaging switch 165 has passed around to the point where this rod engages and opens the switch 166, the opening of the latter switch will halt the motion of the elevator 13. The conveyor 12, however, will continue in motion until its foremost stack is delivered into proper position for being elevated, where this stack will depress the switch 91, open this switch on the conveyor side, and close it on the elevator side, that is, by connecting terminals $p$ and $p'$. The effect of the latter action of switch 91 is to start the elevator 13 in motion again so that this elevator will lift the basket 111 associated with the rod 116 aforementioned against the bottom of the stack positioned as aforesaid in readiness to be elevated and will elevate and separate the boxes of this stack in a manner to be pointed out hereinafter.

The stack elevator 13 is also stopped when a stack of misaligned boxes is delivered to the elevator 13, with one or more misaligned boxes holding the gates 62 open in the dotted line positions shown in Fig. 15. This holds the switch 75 (shown in Figs. 3, 11 and 16) open and causes the elevator 13 to stop when the switch 166 of the elevator 13 is actuated as aforesaid. When, after the elevator has been thus stopped, such a stack of misaligned boxes is straightened to allow the gates 62 to swing inward as indicated by solid lines in Fig. 15, switch 75 is closed, the elevator 13 starts and the unstacker 10 resumes normal operation.

When the stack conveyor 12 is operating, the vertical drums 82 are driven in the directions indicated by the arrows in Fig. 15 by the aforementioned chain 87 and bevel gears 84 and 85 shown in Figs. 3 and 5, the peripheral speed of the drums 82 being equal to the rate of travel of the stack conveyor chains 48. As shown in Fig. 15, the space between the innermost surfaces of the drums 82 is substantially equal to the length of the boxes B and any boxes out of alignment endwise relative to the stack S will be moved into proper alignment as the stack passes between the drums 82, the latter also serving to guide the stack during its elevation by the elevator 13.

As shown in Fig. 12, the unstacking conveyor 14 is timed in relation with the elevator 13 so that the uppermost box of a rising stack S is engaged by one of the box-engaging members 206 when the bottom of this box rises into approximate horizontal alignment with the shaft 106. The unstacking conveyor 14 is driven through the irregularly shaped gears 181 and 188 for the purpose of decreasing the speed of the conveyor 14 at the time of engagement of the uppermost box B of a stack by this member 206 and increasing the conveyor speed during discharge of the box from the unstacker 10. At the time a box is first engaged by this member 206 and urged against the wheels 122 as shown in Fig. 12, the conveyor 14 is traveling at its slowest speed as the portion 190 of the driving gear 188 having the smallest radius is meshing with the extended portion 183 of the driven gear 181.

As the peripheral velocity of the wheels 122 exceeds the lowest rate of travel of the conveyor 14, the box clamped between the wheels 122 and member 206 is lifted slightly faster on the side engaging the wheels 122 as shown in Fig. 13. This mode of operation prevents the possibility of crushing a box between the wheels 122 and the advancing member 206, particularly when the uppermost box is engaged before reaching the height at which it is shown in Fig. 12. As stacks of field boxes vary as much as two inches in over-all height, the uppermost box is apt to be clamped between the wheels 122 and member 206 when the bottom of this box is located variously from one inch below to one inch above the level of the center of the wheels 122.

When the unstacking conveyor 14 moves from the position in which it is shown in Fig. 13 to that shown in Fig. 14, its speed increases to exceed the peripheral speed of the wheels 122. This results in the box being slid over the wheels 122 at a speed greater than the peripheral speed of the wheels. The force required to produce this sliding action increases the pressure of the member 206 against the box sufficiently to prevent the rear side of the box from tipping downward until the box is supported by the rails 236. In this portion of their action the wheels 122 may be said to act as a skidway.

The unstacked boxes are successively pushed onto the accumulator 237 by the unstacking conveyor 14 and should the accumulator become full of boxes so as to depress all three of the switches 240, 241 and 242, the elevator 13 is automatically stopped as aforestated and is restarted when one or more of the accumulator switches is allowed to close by removal of boxes therefrom.

The conveyor jog switch 282 (see Fig. 16) is provided to enable the truckman to start the stack conveyor motor 51 independently of the various control switches should the system stop from under voltage release or other causes after a basket 111 passes the switch 165 with a stack only partially in position to be elevated.

We claim as our invention:

1. In a machine for unstacking a stack of boxes, the combination of: an elevator for receiving and continuously elevating said stack in a substantially vertical plane; box engaging means at the upper end of said elevator for engaging opposite sides of each successive uppermost box of said rising stack; power means for moving said box engaging means upwardly and along opposite sides of a discharge path extending out of the path of said rising stack, said box engaging means being driven at a faster rate of speed than the rate of travel of said elevator, each of said successive uppermost boxes being lifted to immediately free said box from contact with the box therebeneath during the elevation of said stack and discharged out of the path of said stack by said box engaging means, said box engaging means being adapted to maintain said uppermost box in substantially upright position during said lifting and discharging operations.

2. In a mechanism for lifting each successive uppermost box from the top of a rising stack of boxes and transferring each such box out of the path of said rising stack, the combination of: a rotary member rotatable on a horizontal axis and positioned for frictional engagement with one side of said uppermost box; power means for driving said rotary member at a peripheral speed greater than the rate of movement of said stack; a box engaging shoe adapted to engage the side of said box opposite the side engaged by said rotary member; guide means determining the path of travel of said shoe, said path extending across the path of said rising stack and over the top of said rotary member; and power means for moving said shoe along said path, said rotary member and said shoe coacting to lift said uppermost box from said stack, said shoe operating to discharge said box over the top of said rotary member.

3. In a mechanism for lifting each successive uppermost box from the top of a rising stack of boxes and transferring each such box out of the path of said rising stack, the combination of, a rotary member rotatable on a horizontal axis and positioned for frictional engagement with one side of said uppermost box; power means for driving said rotary member at a peripheral speed greater than the rate of movement of said stack; a box engaging shoe adapted to engage the side of said box opposite the side engaged by said rotary member; guide means determining the path of travel of said shoe, said path extending across the path of said rising stack and over the top of said rotary member; power means for moving said shoe along said path, said rotary member and said shoe coacting to lift said uppermost box from said stack and said shoe discharging said box over the top of said rotary member; and power transmitting means associated with said power means to vary the velocity of said shoe, said velocity being decreased as said box is lifted from said stack by said rotary member and said shoe, and increased as said box is discharged by said shoe.

4. A combination as in claim 3 in which the velocity of said shoe during the lifting of said box from said stack is less than the velocity of the periphery of said rotary member and greater than the velocity of said rising stack.

5. In a machine for elevating a stack of filled boxes, the combination of: a substantially vertical stack elevator; a horizontal conveyor for delivering stacks of boxes to said elevator; means for vertically aligning the boxes of a stack transversely of the direction of travel of said stack on said conveyor; and control means responsive to boxes of said stack which are misaligned in relation to said stack in the direction of travel of said stack on said conveyor to prevent said elevator from starting.

6. In a machine for elevating a stack of filled boxes, the combination of: a substantially vertical stack elevator; a horizontal conveyor for delivering stacks of boxes to said elevator; a vertical drum on opposite sides of said conveyor, said drums aligning the boxes of said stack transversely of the direction of travel of said stack; and power means for driving said drums in opposite directions, the inner faces of said drums moving in the same direction as the direction of travel of said stack.

7. A combination as in claim 6 in which said drums are driven from said conveyor at a peripheral speed equal to the rate of travel of said conveyor.

8. In a machine for unstacking stacks of boxes, the latter having sides and bottoms secured to outer edges of the heads thereof, the combination of: an elevator for continuously raising said stack; a pair of spaced box clamping elements at the upper end of said elevator, said elements being positioned to receive and clamp each successive uppermost box of said stack therebetween during vertical movement of said stack, said elements engaging said box on opposite sides thereof; and power means for moving said box clamping elements upward, away from said stack and transversely, out of the path of said rising stack as the latter continues to rise and while holding said box in substantially upright condition, the speed of said upward movement of said clamping members being greater than the speed of said continuously rising stack to enable said members to lift said uppermost box free from the next lower box of said stack prior to moving said box out of the path of said rising stack.

9. In a mechanism for lifting each successive uppermost box from the top of a rising stack of boxes and transferring each such box out of the path of said rising stack, the combination of: a rotary member rotatable on a horizontal axis and positioned for frictional engagement with one side of said uppermost box; power means for driving said rotary member at a peripheral speed greater than the rate of movement of said stack; a box engaging shoe adapted to engage the side of said box opposite the side engaged by said rotary member; and means for moving said shoe against said opposite side of said box to clamp said box against said rotary member and lift said box upwardly from the balance of said stack to separate said box from said stack.

10. In a mechanism for lifting each successive uppermost box from the top of a rising stack of boxes and transferring each such box out of the path of said rising stack, the combination of: a rotary member rotatable on a horizontal axis and positioned for frictional engagement with one side of said uppermost box; power means for driving said rotary member at a peripheral speed greater than the rate of movement of said stack; a box engaging shoe adapted to engage the side of said box opposite the side engaged by said rotary member; and means for moving said shoe against said opposite side of said box to clamp said box against said rotary member and lift said box upwardly from the balance of said stack to separate said box from said stack, said last mentioned means causing said shoe to travel when engaging said box as aforesaid, co-ordinately with said rotary member so as to retain said box in substantially upright condition while separating said box from said stack.

11. In a mechanism for lifting each successive uppermost box from the top of a rising stack of boxes and transferring each such box out of the path of said rising stack, the combination of: a rotary member rotatable on a horizontal axis and positioned for frictional engagement with one side of said uppermost box; power means for driving said rotary member at a peripheral speed greater than the rate of movement of said stack; a box engaging shoe adapted to engage the side of said box opposite the side engaged by said rotary member; and means for moving said shoe against said opposite side of said box to clamp said box against said rotary member and lift said box upwardly from the balance of said stack to separate said box from said stack, said last mentioned means causing said shoe to travel when engaging said box as aforesaid, co-ordinately with said rotary member so as to retain said box in substantially upright condition while separating said box from said stack and while thus maintaining said box in an upright condition, conveying said box in a path which follows and passes over the periphery of said rotary member.

12. In a machine for elevating a stack of boxes, the combination of: a stack elevator; power means for driving said stack elevator; a horizontal conveyor for delivering stacks of boxes to said elevator; and control means responsive to a box out of vertical alignment with the remainder of a stack being moved into position to be elevated by said stack elevator, said control means rendering said stack elevator inoperative prior to elevation of said stack until said box is aligned with the remainder of said stack.

13. A combination as in claim 12 in which said control means is co-extensive with the height of said stack.

14. In an elevating apparatus for a stack of articles or the like, the combination of: horizontal conveyor means for conveying a series of stacks to a given location; an elevator for elevating a stack after the latter has been delivered to said location; and rotary aligning elements disposed at opposite sides of a stack arriving at said location, said aligning elements being spaced a distance substantially equal to the length of said articles so as to align said articles with the remainder of said stack as said stack is delivered to said location.

15. A combination as in claim 14 in which each of said rotary aligning elements comprises a cylindrical drum rotatable about a vertical axis.

16. A combination as in claim 14 in which power means is provided for driving said rotary aligning elements.

17. A combination as in claim 14 in which said rotary aligning elements are positioned to constitute vertical guides for said stack while the latter is being elevated by said elevator.

18. In an apparatus for handling boxes, the combination of: rotary means for frictionally engaging a side of a box when the latter is pressed there-against; shoe means adapted to engage the opposite side of said box; and means for co-ordinately rotating said rotary means and causing said shoe means to travel into engagement with the box as aforesaid and along a path so as to grip said box between said rotary means and said shoe means to lift said box while maintaining said box substantially upright.

19. In an apparatus for handling boxes, the combination of: rotary means for frictionally engaging a side of a box when the latter is pressed there-against; shoe means adapted to engage the opposite side of said box; and means for co-ordinately rotating said rotary means and causing said shoe means to travel into engagement with the box as aforesaid and along a path so as to grip said box between said rotary means and said shoe means and lift said box under the impulse of said shoe means along a path extending over said rotary means, said rotary means and said shoe means co-operating to maintain said box in upright position during movement of said box along said path.

20. In an apparatus for handling boxes, the combination of: rotary means for frictionally engaging a side of a box when the latter is pressed there-against; shoe means adapted to engage the opposite side of said box; power means for co-ordinately driving said rotary means and said shoe means to cause said box to be clamped therebetween and lifted thereby, said power means causing said shoe means to travel at such a rate that after said box has been lifted a certain distance said shoe means propels said box to cause the latter to skid upon and over said rotary member and thus produce a pressure between said shoe means and said box, said pressure preventing the side of the box engaged by said shoe means from dropping.

21. In a box handling apparatus, the combination of: means forming a frictional surface adapted to support a given side of a box by engagement of the lower edge of said side with said surface; friction shoe means for engaging the opposite side of said box; and means for causing said shoe means to move against said opposite side in a direction to force the first mentioned side edge of said box against said frictional surface, skid said box thereacross, and sustain the weight of said box during said skidding by the frictional engagement therewith of said first mentioned means and said shoe means.

22. In a stack handling apparatus, the combination of: a stack elevator; a conveyor for delivering a stack of boxes into position to be elevated by said elevator; stop means for arresting movement of said stack in position to be elevated by said elevator; elevator control means at opposite sides of said delivery conveyor, said control means being moved to operative position during passage of a stack therebetween, the distance between said stop means and said control means being slightly greater than the width of the boxes comprising said stack; and means responsive to said control means to disable said elevator when said control means is retained in said operative position by misaligned boxes of said stack upon the arrival of said stack in position to be elevated.

23. A combination as in claim 22, in which said elevator control means comprises a pair of gates coextensive with the height of said stack.

24. In a stack handling apparatus, the combination of: a stack elevator; a conveyor for delivering a stack of boxes into position to be elevated by said elevator; stop means for arresting movement of said stack in position to be elevated by said elevator; and elevator control means responsive to misalignment of the boxes in said stack in a direction away from said stop means to prevent the elevation of said stack by said elevator.

25. In a box handling apparatus, the combination of: a rotary friction member; means for rotating said member; means for delivering a box to a position alongside said member; shoe means; and means for moving said shoe means along a path to cause said shoe means to engage and hold said box against said member and co-operate with said member in frictionally lifting said box, said shoe means maintaining said box in engagement with said member and then propelling said box over said member while maintaining said box in substantially upright position.

26. In a box handling apparatus, the combination of: a rotary friction member; means for rotating said member; means for delivering a box to a position alongside said member; shoe means; and means for moving said shoe means along a path to cause said shoe means to engage and hold said box against said rotary friction member and co-operate with said member in frictionally lifting said box and then moving said box over said rotary friction member, said moving means causing said shoe to travel at a given rate of speed when first engaging said box and at a substantially accelerated rate of speed when moving said box over said member, while maintaining said box in substantially upright position.

27. In a box handling apparatus, the combination of: a rotary friction member; means for rotating said member; means for delivering a box to a position alongside said member; shoe means; and means for moving said shoe means along a path to cause said shoe means to engage and hold said box against said member and co-operate with said member in frictionally lifting said box, said shoe means maintaining said box in engagement with said member and then propelling said box over said member while maintaining said box in substantially upright position, said shoe moving means causing said shoe to travel, when first binding said box against said member, at a rate which is slower than the peripheral speed of said rotary friction member.

28. In a machine for unstacking a stack of boxes, the combination of: an elevator for receiving and continuously elevating a stack of boxes with the boxes in said stack mainly supported by those boxes in said stack disposed therebeneath; and power driven means positioned to operate on the upper end of said stack in timed relation with the elevation of said stack, said means gripping each of the uppermost boxes in said stack in the planes of the ends of said box, lifting said box upwardly from the balance of said stack, and shifting said box, while retaining the same in upright position, out of the path of said stack.

GEORGE P. MARSDEN.
FRED STEBLER.